United States Patent [19]

Van Eenam

[11] 4,233,417
[45] Nov. 11, 1980

[54] WET STRENGTH POLYMERS

[75] Inventor: Donald N. Van Eenam, Des Peres, Mo.

[73] Assignee: Monsanto Company, St. Louis, Mo.

[21] Appl. No.: 21,414

[22] Filed: Mar. 19, 1979

[51] Int. Cl.$^3$ .......................... C08F 8/18; C08C 19/12
[52] U.S. Cl. .............................. 525/359; 260/29.7 H; 525/329; 525/334; 525/336; 525/379
[58] Field of Search .............................. 525/359, 379; 260/29.7 H

[56] References Cited

U.S. PATENT DOCUMENTS

| | | | |
|---|---|---|---|
| 3,694,393 | 9/1972 | Lewis et al. | 260/29.6H |
| 3,702,799 | 11/1972 | Lewis et al. | 162/168 |
| 4,129,528 | 12/1978 | Petrovich et al. | 525/359 |

*Primary Examiner*—William F. Hamrock
*Attorney, Agent, or Firm*—David Bennett; William J. Farrington; Edward P. Grattan

[57] ABSTRACT

The invention provides a stable polymeric additive useful for improving the wet strength of a cellulosic substrate. The additive is a water-soluble cationic thermosetting polymer incorporating a plurality of extralinear glycidyl quaternary ammonium groups. The invention also comprises a method of making such an additive.

7 Claims, 3 Drawing Figures

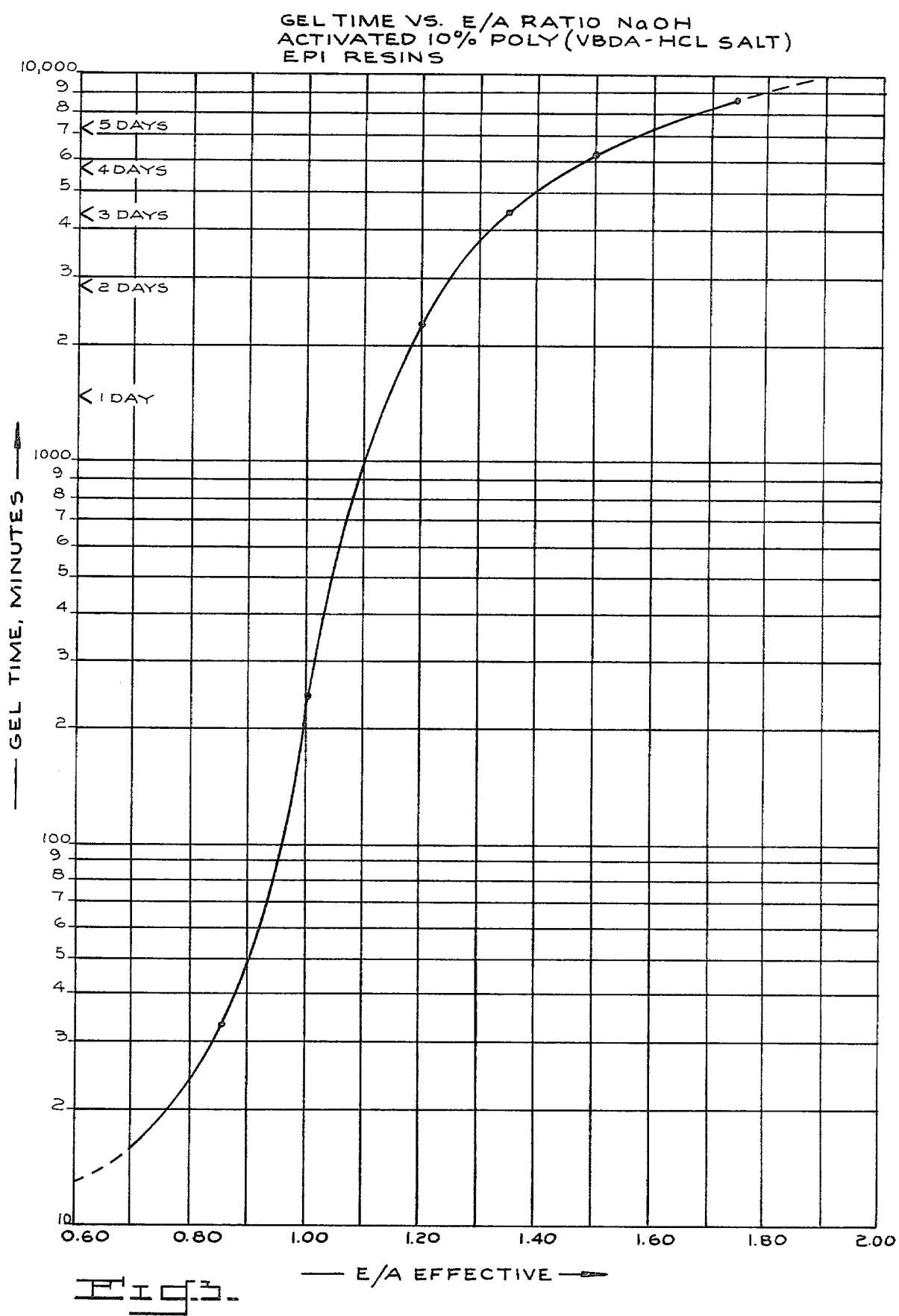

WET STRENGTH POLYMERS

BACKGROUND OF THE INVENTION

This invention relates to novel additives for the production of wet strength in cellulosic substrates.

Untreated paper is essentially a mass of cellulosic fibers held together by their physical contact with adjacent fibers and by hydrogen bonding between hydroxyl groups on the cellulosic polymer chains. Where such paper is placed in water the forces holding the fibers together are dissipated and the structure rapidly loses its coherency. This is a phenomenon that is familiar to all.

For some applications this behavior of wet paper is unsatisfactory as for example when the paper is used to prepare kitchen towels, facial tissues, diaper liners, hand towels and the like. Accordingly, additives have been developed to improve the "wet strength" of such sanitary paper. Such additives are usually applied in such a way that they adsorb onto the fibers of the paper and cure there such that the fibers are in effect bonded together by the cured additive at the interfiber contact points.

DISCUSSION OF THE PRIOR ART

The wet strength additives of the prior art have taken a number of forms but perhaps the most successful group have been based on the reaction of amines with epihalohydrin, usually epichlorohydrin. The amines are usually described as polyamines and this term as used embraces polymers with a plurality of amine groups and "monomers" such as hexamethylene diamine or iminobispropylamine that comprises more than one amine group as well as "(pre)polymer condensates" prepared therefrom through the use of co-reactants such as α,ω-dihaloalkanes, acrylic esters and the like. For purposes of clarity polymers having a degree of polymerization in excess of 5, comprising a plurality of amine groups will be referred to hereafter as "amine polymers" and it is this group particularly that have provided most of the commercially successful wet strength additives.

In the above wet strength additives a portion of the amine groups has been converted into epi-substituted amines, that is to say to produce amine groups with the structure:

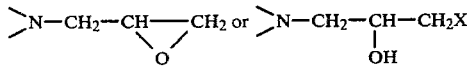

or the quaternary equivalent thereof.

The first form is the so-called "activated" form and the second the "stabilized" form. Which is present depends largely on the pH of the aqueous resin solution.

The generally accepted mechanism for the development of wet strength in such systems is via intra/intermolecular polycondensation crosslinking reactions between free amine groups and amine groups bearing a halohydrin or epoxy substituent or their quaternary equivalents, all present in the polymer structure.

It would appear that in such systems, the amine groups bearing the epoxide radicals react with other nonquaternized amine groups to form crosslinks having the structure:

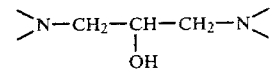

or, where the epoxide-bearing amine group is quaternized and is reacted with a tertiary amine:

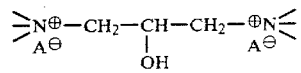

where A⊖ is any suitable anion. This same type of reaction (and reaction sequences leading to the reactant producing such crosslinks) is believed also to contribute substantially toward viscosity build-up during the preparation of conventional wet strength additives.

Wet strength additives of this sort are typified by U.S. Pat. No. 3,855,158 which describes amine polymers, formed by reaction of a α,ω-diamine such as hexamethylene diamine with a α,ω-dihaloalkane such as 1,2-dichloroethane, which are then reacted with epichlorohydrin.

The above types of amine polymer comprise for the most part a mixture of primary, secondary and tertiary amine groups. However, there are other types wherein all the amine groups in the polymer that are subsequently reacted with the epihalohydrin are tertiary amines and it is to polymeric additives produced by the reaction of epihalohydrins with such poly(tertiary amines) that this invention pertains.

One group of such additives is obtained by the reaction of epichlorohydrin with the polymer formed by the polymerization of N-methyl diallylamine and is described in U.S. Pat. Nos. 3,700,623, 3,833,531 and 3,840,504.

Another type is that described in U.S. Pat. Nos. 3,694,393, 3,702,799 and 3,842,054. These patents describe the reaction product of an epihalohydrin with a dimethylaminoalkyl (meth)acrylate ester.

A further polymeric additive type is described in U.S. Patent Application Ser. No. 916,628, U.S. Pat. No. 4,199,756 filed June 19, 1978, which describes the reaction product of epichlorohydrin with polyvinylbenzyldimethylamine.

Whatever the chemical structure of the above amine polymers they all appear to gel rapidly by the crosslinking reaction described above between quaternized amine groups bearing an epoxide group (as a result of reaction with the epichlorohydrin) and remaining non-quaternized tertiary amine groups in adjacent molecules. The reaction is triggered by raising the pH of the polymer solution to a level of about 11–13, thereby activating the polymer. Such polymers are water-soluble, cationic and rapidly thermosetting.

The production of such polymers in alkaline solution must therefore be carefully monitored since the viscosity can build very rapidly with consequent gelation. Obviously, this is undesirable since for maximum effectiveness the polymer is preferably added as an aqueous solution to the "wet end" of a paper machine producing wet strengthened grades of paper. The formation of gel at any time prior to wet web formation is usually unacceptable because it is inefficient and because of the process complications such gelation would cause both during and following activation, especially in the system transporting the activated polymer to the point at which it is added to the substrate.

To avoid gelation during synthesis or manufacture, the conventional amine/epihalohydrin additives are prepared in alkaline solution but, as soon as the viscosity begins to rise rapidly toward incipient gelation, acid is added to short-stop (or "kill") the viscosity building reaction and the solution is diluted to a lower solids level to further reduce the tendency to gel. This final stage needs careful control and is an expensive part of the process.

Reactions of the above type are relatively rapid and conventionally the conditions are such that a sizeable proportion of the epihalohydrin added is lost through side reactions which do not result in the epihalohydrination of tertiary amine groups. It can be seen that when the epihalohydrin is used up and the reaction terminates there will be a substantial proportion of non-quaternized amine groups remaining and that these will react with glycidyl quaternary ammonium groups to produce rapid gelation. By adding acid the epoxide groups are converted to halohydrin groups which are very much more reluctant to undergo the crosslinking reaction. However, directly the pH is raised to a level at which the polymer is once again activated, the tendency to rapid gelation returns.

It has now been found that if essentially all the amine groups have been converted to glycidyl quaternary ammonium groups, the reaction leading to gelatin is not able to take place and the solution becomes stable for prolonged periods even a a pH of 11 or more. In fact, if all amine groups have been efficiently converted in this way, a 5-15% solids aqueous solution will not gel for several hours or even days after activation at a pH of 11 or more. In contrast the products disclosed in the prior art have a gel time that is counted in minutes. The completeness of epihalohydrination of a polymer containing only tertiary amine groups is therefore best judged by the time it takes the resultant polyglycidyl quaternary ammonium salt to gel. This was not heretofore appreciated and a number of patentees have described their products in terms implying that quaternization by epihalohydrination had been completed. In fact, however, as is readily shown, the processes described lead to a polymer containing a mixture of teritiary amines and glycidyl quaternary ammonium groups that gels comparatively quickly at high pH. Examples of such patents include U.S. Pat. Nos. 3,694,393; 3,842,054 and 3,702,799.

It has now been found that the reactions by which the quaternary polymers are formed are extremely temperature dependent and that under the conditions described in the prior art, a completely quaternized polymer cannot possibly be formed.

For the sake of brevity all polymers in which substantially all amine groups therein are quaternized and bear an epoxide group or a group generating an epoxide in alkaline solution are hereinafter referred to as "perepiquat" polymers. They can be regarded as the products of the exhaustive perepichlorohydrination of polymers containing a plurality of pendant tertiary amine groups.

The perepiquat polymers are themselves sensitive to temperature, especially after they have been activated at a pH of about 11. It is believed that this is a reflection of the occurrence of temperature dependent intramolecular rearrangements generating species capable of rapid reaction with other glycidyl quaternary ammonium groups to produce a highly crosslinked intermolecular structure. Regardless of any theory involved, it has been found that genuinely fully quaternized poly(tertiary amines) are characterized by very great resistance to gelation at temperatures below about 25° C., even at high pH levels. Such polymers have extraordinary utility as, inter alia, wet strength additives for application to paper substrates. The better representatives develop more wet strength than the best available commercial additives applied at twice the application level.

The process for the production of perepiquat polymers described herein also has the advantage that it does not require "short stopping" by very rapid acidification and dilution such that the polymers can be produced at reduced cost and handled more easily.

Since the perepiquat polymers are very pH-stable even after activation, they may be applied in solution at the "wet end" of a paper-making machine in much higher concentrations than has hitherto proved possible without seriously exacerbating the problem of premature gelation. This means that the ever-present fear of gelation in the transfer lines and tanks which is so common with conventional additives, especially if the machine has any prolonged "down-time" for any reason, is all but eliminated.

Despite their great stability to pH variations perepiquat polymers cure extremely rapidly in paper during the drying cycle, even under mild conditions. It is found that, using Noble and Wood handsheets in the laboratory, very high "off-machine" cure is obtained.

A further advantage is that perepiquat polymers may be used in conjunction with various commercial amine polymer/epihalohydrin additives to achieve any desired level of wet-strength. Thus, for example, they can be used to boost the wet-strength for any particular paper making run simply by adding the required amount to the regular wetstrength formulation without the need for equipment downtime before the high strength run is made.

Still another advantage of the perepiquat polymers is their utility as additives for such light basis weight products as facial tissue, towelling and the like where low additive levels are preferred.

DESCRIPTION OF THE INVENTION

The invention comprises a process for the production of a water soluble, cationic, thermosetting wet strength additive which comprises reacting at a temperature of 20° C. or less an epihalohydrin and polymer comprising a backbone formed of repeating segments at least 10% of which comprise an amine group substantially all of said amine groups being tertiary amine groups pendant from the backbone and having the structure

 (I)

where ~ Z is the number of bonds through which the nitrogen is linked directly or indirectly through a hydrocarbyl radical to the backbone; ~ Q is the number of bonds by which the tertiary nitrogen is linked to groups selected from methyl and an alkylene group that, together with the nitrogen, provides a heterocyclic group, with the limitations that Q is an integer from 0 to 2 and Z+Q is always 3; the ratio of epihalohydrin groups to tertiary amine groups reacted being greater than the transition ratio (as hereinafter defined) for the reaction conditions selected.

As was indicated above this process produces polymers that are quite different from those obtained using prior art processes and this difference is manifested primarily by the gel time of the polymers. Thus, while polymers having the above formula have been described, the reaction conditions described by the disclosers are such that in fact the transition ratio was not reached and the polymers obtained were not perepiquat polymers. The invention therefore also includes polymers which, on the evidence of their gel time, are indeed true perepiquat polymers.

The present invention therefore also comprises a water soluble cationic thermosetting polymer comprising a backbone formed of repeating segments at least 10% of which comprise an amine group, wherein A. substantially all the glycidyl quaternary ammonium containing groups are pendant from the backbone segment and have the structure

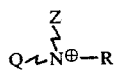

where $-Z$ is the number of bonds through which the quaternary nitrogen is linked directly, or indirectly through a hydrocarbyl radical, to the backbone segment; $\sim Q$ is the number of bonds by which the quaternary nitrogen is linked to groups selected from methyl and alkylene group that together with the nitrogen, provides a heterocyclic group, with the limitation that Q is an integer from 0 to 2 and $Z+Q$ is always 3; and R is selected from

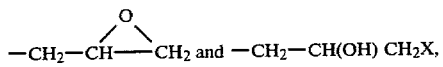

where X is a potential anion; and

B. a 10% solids solution of the polymer in water at 25° C. and a pH of 11 does not gel for at least 10 hours.

It is understood that, under acidic conditions, the epoxy structure adds the elements of $H^+X_H^{31}$, ($X_H$ is a halogen), to give a halohydrin structure which in turn will regenerate the epoxy structure when the pH is raised above 9. Polymers in which substantially all the 2-hydroxy-3-halopropyl substituents on the quaternary ammonium groups therein are converted in alkaline solution to the glycidyl quaternary ammonium structure described above, are likewise considered to be within the purview of this invention. The polymers in alkaline solution are said to be "base-activated" and cure more rapidly and fully than their corresponding non-activated halohydrin counterparts.

The polymers are described as being water soluble but this should not be taken as necessarily indicating a total solubility at all concentrations. Indeed, it may be appropriate, with certain polymers of the invention, to add them to the substrate to be treated in the form of emulsions or dispersions. The term "water-soluble" then is to be taken as indicating at least a limited solubility in water and a character that is hydrophilic rather than hydrophobic.

The invention further comprises a process for improving the wet strength of a fibrous cellulosic substrate which comprises applying to the substrate the base activated perepiquat polymer described above and allowing the polymer to cure in contact with the substrate.

It is an important feature of the process of the invention that the epichlorohydrination reaction temperature is not higher than 20° C. The perepiquat polymers are most sensitive to temperature as they are being formed and, at least during the time in which the major proportion of the reaction is taking place, the temperature must be maintained below about 20° C. and preferably from $-5°$ to 20° C. Preferred maximum temperatures during the reactions are below 15° C. such as about 10° C. or lower. Generally, the major proportion of the reaction occurs in the first 3 or 4 hours and after about 4 hours or more preferably after about 12 hours of the reaction, it is permissible to allow the reaction temperature to increase to ambient temperatures or even higher. For short periods, the temperature can be raised as high as 40° C. if the reaction is essentially complete. There is however, little advantage in raising the temperature during the later stages of the reaction since, as has been indicated above, the perepiquat polymers are somewhat temperature sensitive and apparently undergo changes at temperatures above about 25° C., especially at pH levels of about 11 or more to a composition that behaves in a manner similar to prior art polyamine/epihalohydrin reaction products. The speed of this change and therefore the permissible time that may be spent above 25° C. depends on the extent to which the 25° C. temperature is exceeded.

The emphasis in the above on the amine group not being part of the polymer chain is significant. It would appear that the environment of an amine group that is to be reacted with the epihalohydrin is important because attempts to form perepiquat polymers from certain amine polymers with amine groups in the chain (intralinear amine groups) often results in rapid gelation. This apparently reflects a greater resistance to epihalohydrination of such intralinear amine groups, by comparison with known polymers with extra-linear tertiary amine groups, with the result that there are many potential groups with which the glycidyl quaternary ammonium groups can react to form crosslinks leading to gelation. Since this gelation reaction is a faster reaction than the epichlorohydrination itself, there tends to be a rapid build up of viscosity during the production phase once substantial numbers of glycidyl quaternary ammonium groups have been generated, and rapid gelation ensues. The differentiating factor, as indicated above, is believed to be steric but, irrespective of the theory involved, such intralinear amine groups should be substantially absent if the polymeric additives of the invention are to be obtained.

When the polyamine comprises pendant amine groups having two or more different steric environments, this too can result in different reactivities towards the epihalohydrin reactant and possibly some degree of side reactions may take place. It is therefore, preferred that all pendant amine groups in the polyamine have substantially the same reactivity towards epihalohydrins.

THE TRANSITION RATIO

As indicated above, if an amine polymer in which substantially all of the amine groups present are pendant tertiary amines or their corresponding salts is reacted with an epihalohydrin under traditional molar and/or equivalent ratios of epihalohydrin to amine groups (E/A) and temperatures, the alkali metal hydroxide activated polymer solution will gel in a matter of minutes at concentrations of about 10%.

It has now been found that if the E/A ratio is increased, the reaction temperature is kept below about 20° C. and the reaction conditions remain otherwise unchanged, a point is reached at which the time to gelation of the polymer product increases enormously, often by two or more orders of magnitude, over a very small change in E/A.

The "transition ratio" is defined as the E/A at which the gradient of the graph of gel time against E/A goes through a maximum.

The variation of gel time with E/A is graphically illustrated in FIG. 1 of the drawings, attached hereto to facilitate the understanding of the above definition. The graph represents a plot of gel time (on a logarithmic scale) in minutes against the E/A ratio (linear scale). To obtain the graph 10% solutions of poly(N-methyldiallylamine) HCl salt/epihalohydrin condensate polymers made using different E/A ratios and each caustic-activated to a pH of 11 to 12.5 or more, were observed to determine the time for the reaction mixture to gel (gel time) at ambient temperatures and this time was plotted against the E/A ratio used. The polymers were formed under identical temperature gradients beginning with an initial temperature not greater than 10° C.

As can readily be seen, after a period of slow increase in gel time there is a rapid jump from 10 to 1000 minutes over a range of E/A from 1.58 to about 1.62 before the rate of increase begins to slow down. The maximum rate of increase occurs at an E/A of about 1.60 and this is the "transition ratio" for that particular system.

It is found that the transition ratio depends on both the nature of the polymer to be reacted with the epihalohydrin, the reactivity of the tertiary amines or salts thereof and steric factors associated with the tertiary amine functional group.

The transition ratio is also greatly dependent on the reaction conditions. As can be appreciated by monitoring the dichloropropanol by-product obtained after the amine polymer/epichlorohydrin reaction, some conditions are extremely wasteful of the epichlorohydrin reactant. Thus the pH level; the reaction temperature; the concentration of amine polymer in the solution; the polyamine molecular weight and/or structure; the anion species and/or its concentration; the length of the reaction; and the solubility parameters of the reactants (especially the epihalohydrin); all affect the efficiency of usage of the epichlorohydrin reactant and therefore change the effective E/A ratio. The use of a halide salt of the amine polymer also results in wastage of epichlorohydrin, as is conclusively shown in U.S. Application Ser. No. 916,631, and this leads to a lower effective E/A ratio than that calculated on the basis of the reactants used. The effective E/A ratio can also be affected by the presence of unreacted amine monomer after the polymerization process.

The transition ratio is particularly dependent on the temperature of the reaction and indeed it appears that above about 30° C. the transition ratio cannot be reached no matter how much the ratio of epihalohydrin added to amine group content is raised. For efficient use of the epihalohydrin reactant it is important that the temperature of the reaction, particularly during the early stages when the major proportion of the quaternization reaction takes place, be maintained below about 20° C. such as from −5° to 20° C. and preferably around 10° C.

Thus, in summary, the transition ratio is a characteristic of the specific reaction by which the perepiquat polymer is made. In practice the reaction conditions preferred for the process of the invention are such that permit the most efficient use of the epihalohydrin reactant. This conventionally means operating at a pH of between 7.5 and 9.5 and more preferably between 8 and 9. However, for very reactive polyamine intermediates the reaction may require moderating by a reduction of the pH to about 4 to 7. This has the effect of increasing the amine salt concentration at the expense of the free amine groups thus raising the apparent E/A ratio which of course is calculated on the basis of free or theoretical amine equivalency. The reaction will be self-sustaining since each amine reacting will generate a hydroxyl ion that will in turn free another amine group for reaction.

Other preferred conditions include a reaction temperature of between about −5° and 20° C. and preferably from 5° to 15° C.; and a total solids percentage figure for the reaction of between 10 or preferably 20 and 50% and most preferably 25–35%. The transition ratio in practice defines the minimum E/A that will permit generation of a perepiquat polymer and also indicates the efficiency of the usage of the epihalohydrin in the reaction. Thus, the lower the transition ratio, the more efficient is the utilization of the epihalohydrin. The preferred transition ratio is less than 1.8 and, more preferably still, below about 1.5.

The preferred conditions for the process of the invention are those which result in an epihalohydrin conversion figure of at least 60% (calculated as shown in Table 1 below) and most preferably at least 70%.

As will be appreciated the theoretical value of the E/A ratio for formation of perepiquat polymers is 1.0. However, as indicated above the reaction of the epihalohydrin with the amine is not the only reaction that can occur during epihalohydrination. The chief competing reaction is with free halide ion in the presence of water to produce the two isomeric dichloropropanols but other byproducts can include 3-chloro-1,2-propane diol, glycidol, glycerol and the like.

If therefore, the E/A ratio charged is multiplied by the percentage conversion of the epihalohydrin, the new ratio, called herein the E/A (effective), should approximate 1 if in fact a perepiquat polymer is obtained. As will be seen from the Examples hereinafter presented this is indeed found to be the case.

THE POLYMERIC ADDITIVE

The perepiquat polymers of the present invention are formed by the reaction of an epihalohydrin with an amine polymer wherein substantially all the amine groups in the polymer are extralinear tertiary amines which are not part of the polymer chain or backbone.

Typical examples of amine polymers that can be used to produce the perepiquat polymers include polymers and copolymers of N-methyldiallylamine which contain the repeating group:

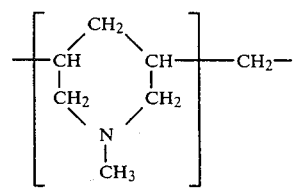

and the corresponding polymers or copolymers where an N-substituted diallylamine is used.

In polymers such as the above in which "Z", (the number of bonds linking the nitrogen atom directly or indirectly to the polymer backbone), is 2 and the nitrogen is part of a cyclic group the "backbone" portion of the cyclic group is taken as being the shortest route around the group in accordance with the conventional usage.

Other preferred polymers are typified by those having repeating units with the structure:

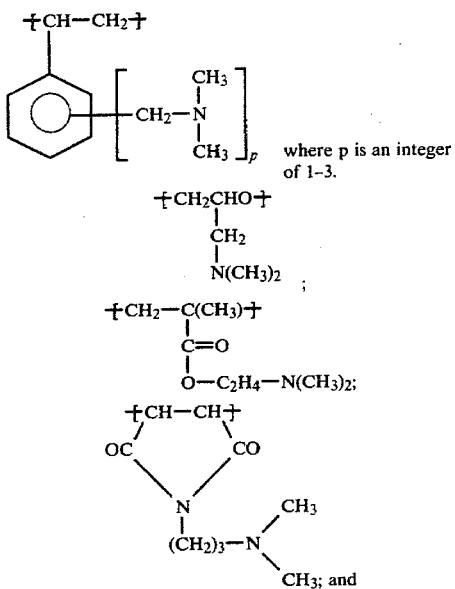

where p is an integer of 1-3.

similar homologous units.

Yet other amine polymers are those formed by polymerizing (including copolymerizing) the following monomers $$CH_2=C(CH_3)-CONH(CH_2)_3N(CH_3)_2;$$
$$CH_2=CH \cdot N(CH_3)_2; \quad CH_2=CH-CH=CH-N(CH_3)_2;$$
$$CH_2=CHOCH_2CH_2N(CH_3)_2;$$

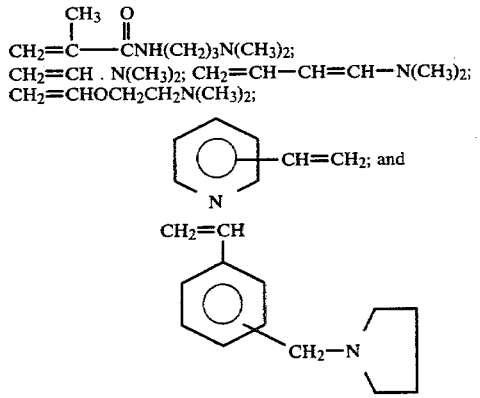

as well as homologues of such monomers.

In each case the perepiquat polymer is formed by reacting the tertiary amine-group containing polymer as its partial salt with epihalohydrin at temperatures below 20° C. under such conditions that substantially all the amine groups are quaternized by alkylation with epihalohydrin.

The amine polymers used in the invention are generally homopolymers but in many cases the presence of up to 90% molar of a comonomer which does not adversely affect the water solubility of the polymer can add specific advantageous properties to the polymeric additive. These can be chemical and/or physical in nature, and can ultimately convey either enhanced paper properties such as softness, tear resistance, absorbancy, creping, printability and the like; or they can facilitate the paper production process by enhancing drainage, fines retention, dye receptivity, Yankee drier release and/or adhesion characteristics and resistance to foam generation. The use of such monomers to form copolymers with the above amine monomers are therefore also within the purview of the invention.

The comonomers that can be used to produce the perepiquat polymers as indicated above should not be such that the water solubility or emulsifyability characteritics of the polymer are lost. In addition to that limitation, it is only required that in the case of vinyl, allyl and related monomers which undergo anionic, cationic or free radical polymerization, the comonomer contain one monoethylenically unsaturated group capable of copolymerizing with the unsaturated group of the tertiary amine or tertiary amine salt monomer. Suitable groups of comonomers among the many available include mono-unsaturated acids such as acrylic acid as well as the esters, nitrile and amide derivatives of such acids; mono-unsaturated alcohols and esters of such alcohols; mono-unsaturated ethers and ketones; and mono-unsaturated hydrocarbons (though below levels which would make the polymer water insoluble as indicated above). Other acceptable mono-unsaturated monomers include vinyl esters, amides, lactams, ethers and the like.

The essential characteristic of the cationic thermosetting polymers when used as wet strength additives is that they are water soluble and that substantially all the original tertiary amine groups present have been converted to quaternary groups with an epoxy substituent. The only other practical limitation involves the ability of the comonomer to copolymerize with the monomer bearing the amine group through a mechanism not involving the amine group. Generally both monomer and comonomer should respond to a common initiating catalyst or catalyst system.

The perepiquat polymers are obtained by the reaction of such amine polymers with an epihalohydrin. This may be for example epichlorohydrin, epibromohydrin or epiiodohydrin but in practice the one most often preferred is epichlorohydrin.

USE OF POLYMERIC ADDITIVE AS WET STRENGTH ADDITIVES

The perepiquat polymers can be applied to a fibrous cellulosic substrate either at the wet end, i.e. to an aqueous slurry of the cellulosic fibers or they can be sprayed onto a cellulosic fiber web. Size press addition is also a feasible alternative. The treated substrate is dried and then cured by heating for a brief period, usually less than 10 to 15 minutes at about 90°-100° C. in an air-circulating oven. Under actual paper mill conditions, where contact time between wet felt-pressed web and "Yankee" or can driers is in the order of seconds, efficient curing nevertheless occurs. The time required for development of good strength is therefore quite short.

Other additives commonly used in the production of paper such as alum, pitch dispersants, dry strength resins, starches, gums, softening agents and Yankee release and coating aids, may be added before or after the wet strength additive of the invention providing there is no interaction between the two that would affect the thermoset curing mechanism.

The levels of perepiquat polymer addition are nearly always very much lower than those typically used with prior art polymers to obtain a similar level of wet strength, often only half the usual amount being required. As a guide the polymer can be added at a level of from 0.5 to 20, but preferably 2 to 10, kilos per metric ton of substrate weight and still give excellent results. This feature is very dramatically illustrated in the accompanying Examples presented below.

In the alternative embodiment the perepiquat polymers may be used in conjunction with a wet strength additive of the conventional kind produced by the reaction of an epihalohydrin with a polyamine at an E/A ratio below the transition ratio. This has the effect of boosting the effectiveness of the conventional additive to a level intermediate between its usual level of performance and that available using the perepiquat polymer alone. The proportions of the two components are conventionally in a weight ratio of from 90:10 to 10:90. Alternatively a compound comprising a plurality of amine groups may be used, in the same proportions, in place of the conventional wet strength additive. The amount of such mixture used to convey wet strength to a cellulosic substrate can be, for example, from 2 to 20 kilos/metric ton.

DESCRIPTION OF THE DRAWINGS

FIG. I is a graph of gel time (on a logarithmic scale) against E/A for the polymers produced by reaction of poly(N-methyldiallylamine) hydrochloride with epichlorohydrin.

FIG. II is a plot of E/A (effective) against the gel time using the data from FIG. I adjusted to E/A (effective) as opposed to E/A as charged.

Figure 1:
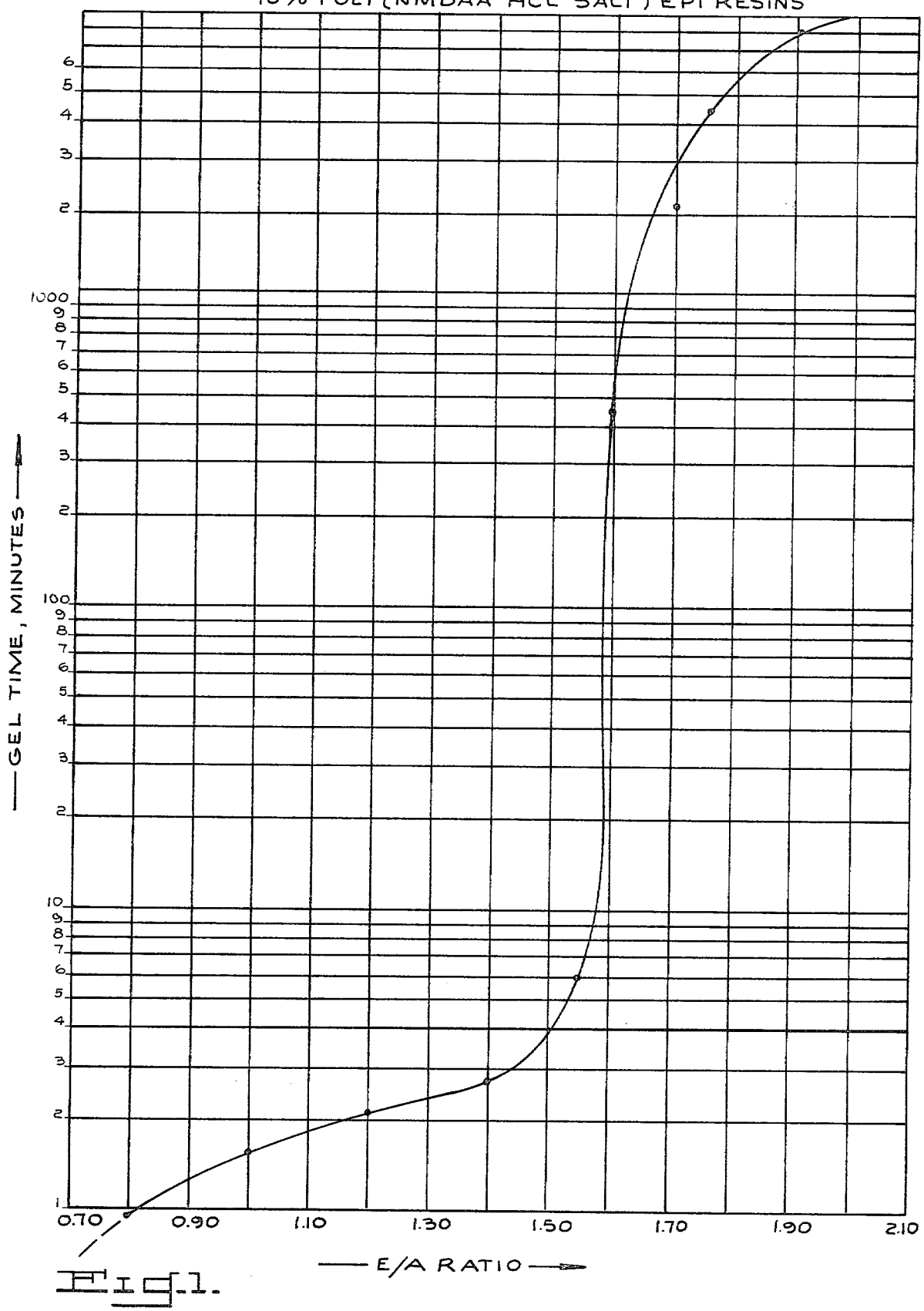
Figure 2:
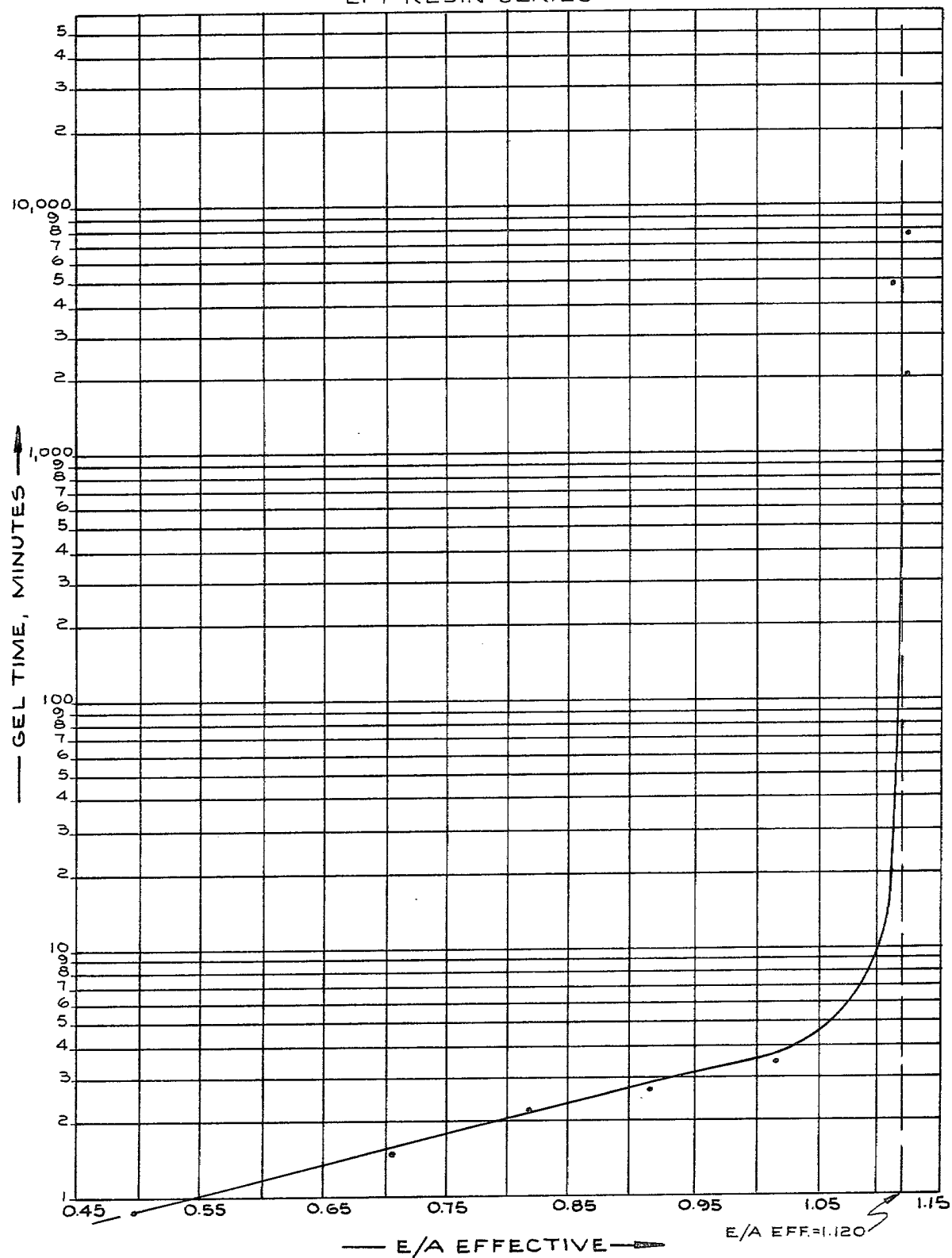

FIG. III is a similar graph to that of FIG. I except that the polyamine is poly(vinylbenzyldimethylamine) hydrochloride.

DESCRIPTION OF SPECIFIC EMBODIMENTS

The invention is further illustrated by reference to Examples which describe the production and testing of various perepiquat polymers and compares the results obtained with other compositions that do not fall within the definition of this invention.

EXAMPLE 1

This Example describes the preparation of a typical wet strength additive according to the invention. This method is adaptable to the production of other additives with suitable adjustments of charge quantities and perhaps reaction times.

The amine polymer used as the basis for the reaction is a poly(N-methyldiallylamine . hydrochloride salt) from which unreacted monomer has been removed, and the epihalohydrin is epichlorohydrin.

A charge of 184.64 g (0.500 amine equivalents of partially caustic soda-neutralized polyamine salt, 80.96 g (0.875 moles) of epichlorohydrin and 369.49 g of deionized water is charged into a 4-necked one liter reaction vessel fitted with addition funnel, thermometer, agitator and condenser. The E/A of the charge was therefore 1.75 and the reaction mixture contained 25% total theoretical solids.

The temperature of the initial reaction mixture was 10° C., the pH was 8.14 and the epichlorohydrin was added to the polyamine/water mixture with stirring over a period of 30 seconds. After 3 hours the temperature was allowed to rise slowly to room temperature overnight.

Eighteen hours after the reaction began the resultant solution was very clear, pale yellow in color, the pH was 8.14 and the Gardner viscosity was A. The viscosity and pH did not change perceptibly during a further four hours so that the reaction was considered finished and acid was added to reduce the pH to 1.19.

The reaction product had a Gardner viscosity of $B^-/B$ and the yield was 82.8% of theoretical. The epichlorohydrin conversion was calculated to be 65.9%.

The polymer, held at ambient temperatures (about 25° C.), was found to be non-gelling at pH of about 11 to 12.5 for about 48 hours. By contrast a leading commercial wet strength additive, ("S-2064", produced by Hercules, Inc.) based on the same polyamine but reacted with epichlorohydrin at a E/A ratio below the transition ratio, gels in about 6 minutes at the same temperature and solids content.

The reaction was repeated essentially as described above at a number of E/A ratios and for each the gel time was measured. The gel time was then plotted against the E/A ratio and the graph appearing as FIG. I was obtained. As can clearly be seen the transition ratio has a value of about 1.60.

The E/A (effective) calculated as described above was then plotted against gel time again using a semi-log graph and the results are shown in FIG. II. From that it can be seen that the E/A effective at the transition point is about 1.12 or reasonably close to the theoretical 1.0 value.

EXAMPLE 2

This Example describes the production of a perepiquat polymer by the reaction of poly(vinylbenzyldimethylamine) hydrochloride salt with epichlorohydrin.

A reaction vessel was charged with 161.3 g (1.0 mole) of distilled vinylbenzyldimethylamine monomer and 400 g of deionized water. The temperature was maintained at 5°–9° C. during the dropwise addition of 96.3 g (approximately 1.0 mol) of 38% hydrochloric acid.

The final pH was adjusted to 4.7 and the salt was freed from inhibitors by four extractions using fresh 30 ml portions of dichloromethane.

The aqueous solution was then stirred in a four-necked flask overnight with air entrainment to remove traces of dichloromethane vapor.

The flask was then fitted with stirrer, thermometer, condenser and the means to bubble nitrogen through the reaction mixture. To this mixture were added 5.0 g of ammonium persulfate. The weight of the reaction mixture was adjusted to 675.7 g (30% total solids). The reaction mixture was stirred and blanketted/sparged with nitrogen at 20° C. for 30 minutes before heating was begun. The temperature was then rapidly raised to 70° C. at which level it was held by air jet cooling. About an hour after reaction began the exothermic reaction subsided and the reaction mixture was maintained at 70° C. for a further two hours by external heating.

The polymerization mixture was a clear light yellow solution and had a Gardner viscosity of about L at about 30% total solids. The pH at 25° C. was 1.36.

The monomer to polymer conversion was calculated to be 100.9%.

The polymer solution so prepared, which weighed 67.57 g and contained 20.53 g (0.100 amine monomer unit equivalents) of polymer solids, was placed in a reaction vessel with 13.52 g of deionized water and was neutralized by the dropwise addition of 36.0 g (0.018 equivalents) of 2.0% aqueous hydroxide, with continuous stirring.

The temperature of this mixture was 10° C. and the pH was 7.56.

While the mixture was kept cooled and stirred 11.1 g (0.12 mole) of epichlorohydrin were added over a period of 30 seconds. The temperature was allowed to rise slowly over a five hour period to 20° C. at which time the pH was 8.48 and the Gardner viscosity was A+/B−.

The reaction mixture was stirred at room temperature overnight and the following day the reaction was stopped by addition of 0.5 g of 96% sulphuric acid, thereby dropping the pH from 7.59 to 1.10.

The Gardner viscosity of the product was B−/B at a total solids of 24%. The percentage therorectical yield was 102.3%. Similar productions at different E/A ratios were carried out and in each case the gel time at a pH above 11 was determined in the manner described above.

The gel times obtained were plotted against the corresponding E/A to give the graph appearing at FIG. III of the Drawings. Again a period of rapid increase of gel time over a comparatively short range of E/A is observed. The transition ratio is estimated to be about 1.1.

It is significant that this result is very close to the theoretical E/A ratio of 1.00, showing that the conditions chosen were such that the side reactions tending to waste the epichlorohydrin reactant were disfavored by the reaction conditions.

EXAMPLE 3

Essentially the same procedure as is described in Examples 1 and 2 is used to produce other additives according to the invention. The reactions are summarized in Table 1 below.

Polymers of 1-3 are the same as those produced in Example 1 except for the E/A ratio. Polymer 4 is basically the same as Polymers 1-3 except that the sulphuric acid salt is used in place of the hydrochloric acid salt to prepare the polyamine.

Polymer 3 is that described in Example 1.

Polymers 5 and 6 are derived from the reaction of poly(vinylbenzyldimethylamine)hydrochloride with epichlorohydrin using a process substantially as described in Example 2 adjusted to conform to the different E/A ratio.

In each case the reaction was initiated at 10° C. and allowed to reach the higher temperature during the course of the reaction. Polymers 1 and 4 were raised to 40° C. after 19 and 24 hours of reaction time i.e., after the reaction was essentially complete. Prior to that the reaction temperature had been around 20° C.

TABLE I

|  | Polymer 1 | Polymer 2 | Polymer 3 | Polymer 4 | Polymer 5 | Polymer 6 |
|---|---|---|---|---|---|---|
| POLYMER PREPARATION | | | | | | |
| E/A Ratio (1) | 2.0 | 1.70 | 1.75 | 1.80 | 1.50 | 1.50 |
| Run Conc., % (2) | 25% | 25% | 25% | 30% | 25% | 25% |
| Rxn Temp., C.° | 10°-40° | 10°-21.8° | 10°-20° | 10°-40° | 10°-25° | 10°-22.5° |
| NaOH, Eq. % | 0 | 0 | 0 | 12.5 | 0 | 0 |
| Run pH (3) | 8.22-7.48 | 8.63-8.10 | 8.62-8.10 | 8.91-7.07 | 8.18-7.54 | 8.21-7.51 |
| Kill Visc., Gardner | A-1 | B | A | — | A-1 | A-1 |
| Rxn Time, hrs. | 22:00 | 22:00 | 23:00 | 27:00 | 24:00 | 24:00 |
| POLYMER PROPERTIES | | | | | | |
| pH 25° C. | 2.95 | 2.38 | 2.23 | 2.57 | 2.74 | 2.89 |
| Viscosity Gardner (4) | A-1 | B+ | B−/B | F−/F | A-1− | A-1− |
| T.S. % | 16.44% | 21.12 | 20.64 | 25.97 | 16.44 | 22.64 |
| Resin Yield, % (5) | 77.9% | 86.0 | 82.8 | 92.7 | 77.9 | 88.8 |
| Epi Conversion, % (6) | 67.2% | 66.2 | 65.9 | 84.3 | 67.2 | 74.6 |
| % DCP @ T.S. Found | 4.90% | 5.48 | 5.70 | 2.40 | 3.60 | 3.53 |

(1) Moles epi/total amine unit equivalents
(2) Total organics charged/resin solution weight (100)
(3) General profile: initial pH 7.5-8.1, increasing to the max. value within 3-4 hours, then gradually falling off to 8.0.
(4) % T.S. found
(5) (Experimentally determined total solids/theoretical total "solids" charged) × 100.
(6) Determined as follows:

$$\text{Epi Conversion} = \frac{(\text{Epi chg'd., g.}) - \frac{(\%DCP @ T.S.\%)(\text{Prep. Wt., g.})(0.7173)}{100}}{\text{Epi chg'd., g.}} \times 100$$

(where $0.7173 = \text{MW Ratio} \frac{\text{Epi}}{\text{DCP}}$)

EXAMPLE 4

This Example describes the method by which the perepiquat polymers whose production is described in Example 3 were tested for wet strength and details the results obtained.

In each case a pulp slurry of a 50/50 blend of bleached hardwood and bleached softwood Kraft fibers with a pH of 7.0 and a Canadian Standard Freeness of 457 was prepared. To volumetrically measured samples of this slurry were added, with stirring, measured aliquot amounts of one of the polymers produced in Example 3. Prior to addition to the pulp slurry the polymers, at concentrations of from 3 to 10%, were activated by the addition of 7.0 meq of 25% aqueous sodium hydroxide per gram of resin solids during 15 seconds. The mixture was stirred throughout the addition and thereafter at room temperature for one minute before being diluted to 1.2% concentration by addition of more deionized water.

Enough of the activated resin solution was added with stirring to the pulp slurry to correspond to an application level of 5.0 kilos per metric ton. The treated pulp slurry was then allowed to stand at room temperature for 10 minutes before being made into hand sheets.

The treated fibers were formed into a wet laid web with a press consistency of 36.1% and dried for 2 minutes at 96° C. The resulting 2.5 g 20.3×20.3 cm Noble and Wood hand sheets were left at constant temperature and humidity for one day before being cut into 2.5 cm × 20.3 cm strips and tested for tensile strength on an Instron Tensile Tester. Half of each group of samples was tested after being cured for 15 minutes at 90° C. in a circulating oven and then water soaked for 10 minutes. The other half omitted the curing process and thus represents uncured, "off-machine" test sheets.

The results are set forth in Table II below. It should be noted that the polymers 1 and 4 where the reaction temperatures were raised to 40° C. for 3 hours at the end of the reactions perform somewhat worse than the others that never exceeded 25° C.

TABLE II

| | WET TENSILE STRENGTH | | |
|---|---|---|---|
| | WET TENSILE STRENGTH* (gm/cm) | | |
| POLYMER | Uncured (U) | Cured (C) | U/C Ratio |
| 1 | 829 | 989 | 0.838 |
| 2 | 852 | 1039 | 0.820 |
| 3 | 893 | 1102 | 0.810 |
| 4 | 755 | 979 | 0.772 |
| 5 | 857 | 1014 | 0.845 |
| 6 | 857 | 1034 | 0.829 |

*Average of 4 pulls on an Instron Tensile Tester.

EXAMPLE 5

This Example describes the results of comparing the wet strength efficiency of a commercial wet strength additive prepared by the prior art methods with a perepiquat polymer made using the same reactants but with an E/A above the transition ratio.

Both polymers were produced by the reaction of poly(N-methyldiallylamine) hydrochloride with epichlorohydrin. The comparative example was "S-2064", a wet strength additive supplied by Hercules, Inc.

The polymer of the invention was "Polymer 3" described in Example 2.

Both polymers were activated with caustic soda in the manner described in Example 4.

The polymers were applied in the manner described in Example 4 except that the pulp had a Canadian Standard Freeness of 450.

The results are set forth in Table III below.

TABLE III

| | Comparative Wet Tensile Strengths* (gm/cm) | | |
|---|---|---|---|
| | Uncured (U) | Cured (C) | U/C Ratio |
| Polymer 3 | 956 | 1102 | .867 |
| "S-2064" | 732 | 882 | .830 |

*Average Level 5.0 kilos/metric ton. Tensile strengths are average of 4 pulls on an Instron Tensile Tester.

As can be seen from the above data, the perepiquat polymers have a vastly superior effectiveness as wet strength additives in addition to having a greatly extended gel time.

EXAMPLE 6

This Example compares polymer 3 (from Example 2) to two commercial wet strength additives, Kymene 557 H and Kymene 557 M, for efficiency. "Kymene" is a trade name of Hercules Company. Kymene 557 H and 557 M are epichlorohydrin-bodied polyaminoamide resins of the kind described in U.S. Pat. Nos. 2,926,116; 2,926,154; 3,058,873; 3,724,986 and 3,240,761.

The test method was that given in Example 4 except that the pulp finish was 80% bleached softwood Kraft/20% bleached hardwood Kraft. The Canadian Standard Freeness was 550, and the basis weight was 0.311 kg/sq. meter (210 pounds/3300 sq.ft. ream). The pH of the pulp was 7 and the hardness was 100 ppm.

Before addition to the pulp each polymer was activated in solution at 10–12% polymer solids using 7.0 meq/g of 50% aqueous sodium hydroxide followed by dilution to 5% concentration using deionized water.

The wet tensile strength results obtained are given in Table IV. Each is the average of four pulls on an Instron Tensile Tester.

TABLE IV

| Polymer | Application Level kilos/metric ton | Wet Tensile Strength (gm/cm) | |
|---|---|---|---|
| | | Uncured | Cured |
| Polymer 3 | 1.5 | 1893 | 1929 |
| | 3.0 | 2840 | 3108 |
| Kymene 557 H | 2.5 | 1945 | 2179 |
| | 5.0 | 2661 | 3000 |
| | 7.5 | 2822 | 3179 |
| Kymene 557 M | 2.5 | 1572 | 1822 |
| | 5.0 | 2161 | 2411 |
| | 7.5 | 2358 | 2661 |

Thus, it can clearly be seen that Polymer 3 at 3.0 kilos/metric ton performs comparably in both cured and uncured tests to Kymene 557 H at 7.5 kilos per metric ton and much better than Kymene 557 M at that level. Expressed differently the level of performance of Kymene 557 H is achieved using "Polymer 3" at only 40% of the Kymene 557 H application weight.

This Example illustrates the versatility of the polymers of the invention in producing a wet strength additive of the traditional type with enhanced effectiveness.

In the reactions described below, a compound comprising a plurality of amine groups was added with stirring to a cooled dilute perepiquat polymer. In each case acid short-stopping was required when the viscosity began to build.

It seems clear that these mixed polymers represent products somewhat similar to the polymers of the prior art in that the curing is the result of the reaction of "epi" groups contributed by the perepiquat resin with the amine groups on the amine polymer.

The process for the production of the blends is summarized in Table V and the properties are set forth in Table VI.

TABLE V

| PREPARATION OF POLYMER BLENDS | | | | | | | |
|---|---|---|---|---|---|---|---|
| | A | B | C | D | E | F | G |
| Perepiquat polymer | 2 | 3 | 3 | 3 | 4 | 6 | 6 |
| Amine containing additive | DCE/HMD(1) | PEI(2) | tetra-methyl HMD | Amine polymer used in (3) | Diethylene triamine | DCE/HMD(1) | Diethylene-triamine |
| E/A(5) | 1.3 | 1.4 | 1.0 | 1.4 | 1.3 | 1.3 | 1.10 |
| Run concentration (%) | 15 | 15 | 15 | 22 | 17.5 | 17.5 | 20 |
| Reaction Temp(°C.) | 10–15 | 10–20 | 10–30 | 10–30 | 10 | 10–30 | 10–30 |

TABLE V-continued

| | PREPARATION OF POLYMER BLENDS | | | | | | |
|---|---|---|---|---|---|---|---|
| | A | B | C | D | E | F | G |
| NaOH Equivalent % | 0 | 0 | 0 | 125 | 0 | 0 | 0 |
| Run pH | 10.8.73 | 9.11–8.82 | 9.82–9.29 | 8.65–7.38 | 10.35–9.46 | 10.12–8.26 | 10.05–8.75 |
| Gardner Viscosity at kill | D+ | H | H | H | L/M | E/F | F/G |
| Reaction time (hrs.) | 1:45 | 1:20 | 1:35 | 4:15 | 2:0 | 2:45 | 1:25 |
| pH at 25° C. | 2.04 | 1.68 | 2.17 | 2.09 | 2.34 | 2.24 | 1.86 |
| Gardner viscosity | C | I/I+ | H | D+ | R | E/E+ | G+ |
| Total solids % | 16.27 | 12.64 | 14.35 | 17.48 | 12.2 | 17.25 | 16.56 |
| Resin yield % | 104.4 | 103.7 | 103.2 | 104.7 | 103.7 | 103.4 | 104.2 |
| % DCP at % T.S. found(4) | 2.40 | 2.27 | 1.42 | 3.28 | 0.48 | 1.3 | 1.4 |

(1)Reaction product of dichloroethane with hexamethylene diamine in a ratio of 0.75:1 after halide has been removed from the amine polymer produced
(2)Polyethylene imine (commercial)
(3)N,N,N',N'-tetramethyl-1,6-hexamethylene diamine
(4)% Dichloropropanol at the total solids found.
(5)Theoretical epiquat equivalents in the perepiquat polymer/amine equivalents in amine prepolymer.

TABLE VI

WET TENSILE STRENGTHS OF POLYMER BLEND CONDENSATES (1)

| Blend | Application Level (kilos/metric ton) | Uncured Tensile Strength(gm/cm) | Cured Tensile strength(gm/cm) |
|---|---|---|---|
| A | 2.5 | 493 | 688 |
| | 5.0 | 654 | 843 |
| | 7.5 | 763 | 948 |
| B | 2.5 | 557 | 736 |
| | 5.0 | 670 | 843 |
| | 7.5 | 686 | 970 |
| C | 2.5 | 436 | 572 |
| | 5.0 | 645 | 822 |
| | 7.5 | 757 | 893 |
| D | 2.5 | 552 | 755 |
| | 5.0 | 711 | 922 |
| | 7.5 | 800 | 1011 |
| E | 2.5 | 423 | 614 |
| | 5.0 | 664 | 891 |
| | 7.5 | 805 | 1006 |
| F | 2.5 | 475 | 691 |
| | 5.0 | 645 | 882 |
| | 7.5 | 779 | 973 |
| G | 2.5 | 480 | 654 |
| | 5.0 | 734 | 897 |
| | 7.5 | 857 | 1009 |

(1) Average of 2 pulls on an Instron Tensile Tester. The application and testing procedure was that outlined in Example 4.

The application and testing procedure was that outlined in Example 4.

EXAMPLE 8

This Example illustrates the extreme temperature dependence of the reaction to produce the perepiquat polymers.

Two reactions were conducted side-by-side under substantially identical conditions apart from the reaction temperature. In the first, the reaction was initiated at 10° C. and allowed to rise no higher than 13° C. In the second, the reaction was initiated and maintained at 25° C.

The reactants in each case were epichlorohydrin and poly(N-dimethylaminoethylmethacrylate.HCl salt) with an E/A ratio (charged) of 1.25 and the polymers were activated at 10% solids solution and room temperature using 25% NaOH at 7 meq/g.

The polymer produced at 25° C. had a gel time of 230 minutes whereas the one produced at 10°–13° C. had a gel time of 1530 minutes.

From these results it can clearly be seen that at the lower reaction temperatures the transition ratio had clearly been exceeded and a true perepiquat polymer obtained whereas at the higher temperature the transition ratio had still not been reached and the polymer failed to reach the same high level of stability that characterizes perepiquat polymers.

EXAMPLE 9

This Example illustrates the temperature dependence of the sodium hydroxide-activated polymer produced in Example 1.

Two samples of the polymer at 25° C. were adjusted to 10% solids concentration and activated to a pH of 12+, (autogenously decreasing to 11 during the course of the reaction), using caustic soda.

The first sample was heated to 50° C. and the second was kept at 25° C.

The first gelled after 15.33 minutes and the second after 4320 minutes.

This shows the extreme sensitivity to temperature of activated perepiquat polymers.

EXAMPLE 10

This Example illustrates the temperature dependence of the reaction by which perepiquat polymers are obtained.

Three polymers A, B and C based on the reaction of epichlorohydrin with poly(N-methyldiallylamine.HCl salt) are prepared at an E/A (charged) ratio of 1.70. The initial reaction conditions were identical with the temperature 20° C. and the pH 7.82.

Polymer A was produced at a reaction temperature that was reduced to, and maintained at, 15° C. Polymer B was produced at a temperature that was raised to, and maintained at, 30° C. Polymer C was produced at 50° C. and held at that temperature until it was necessary to kill the reaction by the addition of acid to prevent gelation.

Polymers A, B, and C, simultaneously activated as solutions with a 10% solids concentration using 25% aqueous sodium hydroxide, had gel times of 1710 minutes, 70 minutes and 4 minutes 20 seconds, respectively.

This clearly shows that the Polymer A was a true perepiquat polymer whereas Polymers B and C were not.

EXAMPLE 11

This Example describes the effect of temperature on the gelation time of a copolymer.

A 50/50 molar copolymer of vinylbenzyidimethylamine (partial hydrochloride salt) with acrylamide was reacted with epichlorohydrin at an E/A of 1.20 under two different temperature conditions. The first reaction was conducted in essentially the manner described in Example 2. The second reaction was substantially identical except that the reaction was carried out at 25° C.

The gel times for identically caustic activated 10% solids solutions of each were measured. The polymer produced under the conditions set forth above for the production of a perepiquat polymer gelled in 630 minutes whereas the one prepared at 25° C. gelled in 31 minutes.

The above results indicate clearly that the presence of a comonomer does not interfere with the phenomenon described herein.

EXAMPLE 12

One of the advantages of the perepiquat polymers of the invention is their compatibility with conventional caustic-activated wet strength additives. They can therefore be used to enhance the efficiency of such conventional additives without loss of any of their beneficial properties.

This Example describes the effectiveness of blends of a perepiquat additive with a conventional additive in varying proportions.

The first component of the blend was a perepiquat polymer obtained by a replication of the reaction used to produce Polymer 3 of Example 3 (above) with the minor difference that the reaction was initiated at 5° C. and was allowed to rise to 15° C. after 3 hours. The analysis of the reaction product showed a slightly lower conversion of epichlorohydrin.

The second component of the blend was a commercial wet strength additive obtainable from Monsanto Company under the Registered Trade Mark "Santo-Res" 31 (SR-31). This is a reaction product of epichlorohydrin and an amine prepolymer obtained by a process comprising the reaction of an alkylene diamine and a dihaloalkane.

The perepiquat resin was used as a 20.7% total solids solution and the Santo-Res 31 as a 24.5% total solids solution.

The components were blended to give the desired weight/weight ratios and then diluted to 4.0% total solids concentration. The solutions were activated by addition of 7.0 meq/gram of 25% sodium hydroxide over 5–10 seconds.

After one minute of stirring the activated solutions were diluted to 1.2% concentration of the activated additive blend using deionized water.

These solutions were then screened for uncured and cured (15 minutes at 90° C. in a circulating air oven) wet tensile strength using standard "Noble and Wood" handsheet papermaking conditions. Three addition levels were used in the evaluation and the results are set forth in the following Tables VII, VIII and IX.

TABLE VII

ADDITIVE WET TENSILE STRENGTH EFFICIENCY COMPARISON UNCURED

| Blend | | | |
|---|---|---|---|
| Wt. % of PEQ[1] | Wt. % of SR-31[2] | Summed Wet[3] Strength (gm/cm) | % of Control |
| — | 00 (control) | 1929 | 100% |
| 20 | 80 | 2209 | 114.5% |
| 40 | 60 | 2406 | 124.7% |
| 60 | 40 | 2499 | 129.5% |
| 80 | 20 | 2672 | 138.5% |
| 100 | 0 | 2692 | 139.5% |

[1] "PEQ" indicates the perepiquat polymer component.
[2] "SR-31" indicates the Santo-Res 31 component.
[3] This column is a cumulation of the average wet strength of three samples at each of three different levels of application: 2.5, 5.0, and 7.5 Kg of the blend per metric ton of paper substrate.

TABLE VIII

ADDITIVE WET TENSILE STRENGTH EFFICIENCY COMPARISON CURED

| Blend | | | |
|---|---|---|---|
| Wt. % of PEQ | Wt. % of SR-31 | Summed Wet Strength (gm/cm) | % of Control |
| 0 | 100 | 2842 | 100% |
| 20 | 80 | 3043 | 107% |
| 40 | 60 | 3243 | 114% |
| 60 | 40 | 3301 | 116% |
| 80 | 20 | 3402 | 120% |
| 100 | 0 | 3447 | 121% |

The column headings in this Table have the significance set forth below Table VII.

TABLE IX

This Table sets forth the average ratio of uncured to cured wet strength for each blend at the three levels of addition used. It clearly shows that PEQ additives give a higher degree of development of wet strength without cure than do conventional additives.

TABLE IX

UNCURED/CURED WET TENSILE STRENGTH RATIO

| Wt. % PEQ | Wt. % SR-31 | Addition Level Kg/metric ton | Uncured/Cured W.T.S. Ratio | Average U/C Ratio |
|---|---|---|---|---|
| 0 | 100 | 2.5 | 0.634 | 0.673 |
| | | 5.0 | 0.662 | |
| | | 7.5 | 0.722 | |
| 20 | 80 | 2.5 | 0.690 | 0.722 |
| | | 5.0 | 0.721 | |
| | | 7.5 | 0.755 | |
| 40 | 60 | 2.5 | 0.693 | 0.739 |
| | | 5.0 | 0.781 | |
| | | 7.5 | 0.744 | |
| 60 | 40 | 2.5 | 0.760 | 0.758 |
| | | 5.0 | 0.776 | |
| | | 7.5 | 0.738 | |
| 80 | 20 | 2.5 | 0.751 | 0.784 |
| | | 5.0 | 0.794 | |
| | | 7.5 | 0.806 | |
| 100 | 0 | 2.5 | 0.819 | 0.778 |
| | | 5.0 | 0.742 | |
| | | 7.5 | 0.774 | |

The results set forth above in Tables VII to IX show clearly that there is substantial advantage to be gained by using the perepiquat additives in conjunction with known alkali-activated wet strength additives. This method provides a simple way of upgrading the wet strength characteristics of a paper without increasing the loading of wet strength additive. The addition of the perepiquat produces an almost linear improvement in wet strength at least at proportions below about 60 weight %, so that prediction of the amount of perepiquat additive required to attain a given wet strength is relatively simple. This is also a strong indication that the cure mechanisms of the components are independent of one another and that therefore the differences between perepiquat polymers and conventional polyamine/epichlorohydrin additives are not merely of degree but of kind.

EXAMPLE 13

This Example explores the effect of dilution on the gel time with the object of finding whether a polymer, prepared at the kind of temperature that is conventional in the prior art, (25° C. initially raised to 50° C.) has a gel time that compares to that of a perepiquat resin. For the sake of comparison a perepiquat polymer was obtained under identical conditions except that the temperature was maintained at 5°–10° C.

Identical amounts of poly(N-methyldiallylamine hydrochloride salt), which had been separated from unreacted monomer, were reacted with identical amounts of epichlorohydrin at an E/A ratio of 1.70 and a total solids concentration of 5%. The first reaction was initiated at 5° C. and allowed to rise to 10° C. over a 48 hour reaction time and the second was initiated at 25° C. and then raised to 50° C. for a 6 hour reaction period.

At the end of each reaction the mixtures were acidified with identical amounts of sulphuric acid. The yield of the first and second reactions were 84.2% and 81.1% respectively with corresponding epichlorohydrin conversions of 81.5% and 73%.

Solutions of the two polymers each containing 1 gm. of the polymer were concentrated to about 8 gm of solution in vacuo on a Büchi Rotavaporator using a 250 ml round-bottomed flask, a 30° C. water bath and an aspirator vacuum of 15 mm of mercury. The resin solutions were each diluted to 9.3 g with deionized water and transferred to 10 ml. beakers.

To each stirred solution was added 0.88 ml. of 25% aqueous sodium hydroxide over a period of 5 seconds. These activated solutions were set aside at room temperature and observed for viscosity increase leading to gelation.

The polymer prepared at 5°–10° C. (perepiquat polymer) gelled after an average of 1583 minutes whereas the polymer produced at 25°–50° C. gelled after an average of 6 minutes 40 seconds.

It would appear therefore that producing the polymers at low dilution does nothing to reduce the differences between perepiquat polymers of the invention and those polymers prepared at temperatures of the processes of the prior art.

The above Examples are presented for the purposes of illustration of the perepiquat polymers of the invention and the manner of their production and are not intended to imply any limitation on the scope of the invention described herein.

It is foreseen that a number of non-essential variations and modifications could be made to the compositions and processes described herein without departing from the basic invention. It is intended that all such modifications and variations be embraced within the purview of this invention.

What is claimed is:

1. A process for the production of a water soluble, cationic, thermosetting polymeric wet strength additive which comprises reacting, in an aqueous medium maintained at a temperature of 20° C. or less, an epihalohydrin and a polymer comprising a backbone formed of repeating segments at least 10% of which comprise an amine group and/or partial salts thereof substantially all of said amine groups being tertiary amine groups pendant from the polymer backbone and having a structure selected from the group consisting of

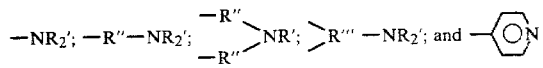

wherein
R' is selected from the group consisting of methyl and, where the nitrogen atom bears two R' groups, these together with the nitrogen can form a heterocyclic radical;
R" is a divalent radical and R''' is a trivalent radical;
the unattached bond in each amine structure being attached directly to a carbon atom of the polymer backbone;
the ratio of epihalohydrin groups to tertiary amine groups reacted being not less than the transition ratio for the reaction conditions selected.

2. A process according to claim 1 in which the reaction temperature is from −5° to 15° C.

3. A process according to claim 1 in which the amine-containing polymer comprises at least 50 molar percent of units derived from N-methyldiallylamine.

4. A process according to claim 1 in which the amine-containing polymer comprises at least 40 molar percent of units derived from vinylbenzyldimethylamine.

5. A process according to claim 1 in which the transition ratio is less than 1.8.

6. A process according to claim 1 in which the epihalohydrin is epichlorohydrin.

7. A process for the production of a water-soluble, cationic, thermosetting polymeric wet strength additive which comprises reacting in an aqueous medium maintained, at a temperature of from −5° to 20° C., epichlorohydrin and a polymer selected from the group consisting of poly(N-methyldiallylamine), poly(vinylbenzyldimethylamine) and poly(N,N-dimethylaminoethylmethacrylate), at a pH of from 4 to 9.5 and a total solids percentage figure for the reaction mixture of from 10 to 50%, the conditions being selected such that the transition ratio for the system is less than 1.8 and the ratio of epichlorohydrin to tertiary amine groups in the reaction components is not less than the transition ratio.

* * * * *